United States Patent [19]

Sanders et al.

[11] Patent Number: 5,773,786
[45] Date of Patent: Jun. 30, 1998

[54] METHOD AND DEVICE FOR REDUCING OVERPENETRATION AT THE START OF PLASMA ARC WELDS

[75] Inventors: John M. Sanders, Jackson Township, Stark County, Ohio; John M. Lehmann, Bedford County, Va.; Patrick M. Ryan, Washington Township, Stark County, Ohio

[73] Assignee: McDermott Technology, Inc., New Orleans, La.

[21] Appl. No.: 932,596

[22] Filed: Sep. 17, 1997

[51] Int. Cl.[6] .................................................. B23K 10/00

[52] U.S. Cl. .............................. 219/121.46; 219/121.45; 219/121.59; 219/121.48

[58] Field of Search ........................... 219/137 R, 121.45, 219/121.46, 121.48, 121.59, 121.36, 74, 75, 118, 119

[56] References Cited

U.S. PATENT DOCUMENTS 5,225,654  7/1993  Harwig et al. ..................... 219/121.46
5,719,369  2/1998  White et al. ....................... 219/121.46

*Primary Examiner*—Mark H. Paschall
*Attorney, Agent, or Firm*—Robert J. Edwards; Eric Marich

[57] ABSTRACT

A shim for improving plasma arc weld quality has ends tapered at about 25° and notches at each end roughly centered over the corner between the tapered ends and main body of the shim. The improved shim allows lower starting plasma arc heat input and reduces the occurrence of sagging, or overpenetration, of the weld.

1 Claim, 3 Drawing Sheets

METHOD AND DEVICE FOR REDUCING OVERPENETRATION AT THE START OF PLASMA ARC WELDS

FIELD AND BACKGROUND OF THE INVENTION

The present invention relates generally to the field of plasma arc welding and, in particular, to a new and useful method and device for joining two elements together using plasma arc welds such that overpenetration of the weld joint is reduced.

Plasma arc welding (PAW) is an arc welding process that produces coalescence of metal by heating with a constricted arc between an electrode and the workpiece (transferred arc) or between the electrode and the constricting nozzle (nontransferred arc). Shielding is generally obtained from the hot, ionized plasma gas issuing from the torch. This plasma gas is usually supplemented by an auxiliary source of shielding gas. The shielding gas may be a single inert gas or a mixture of inert gases. Pressure is not applied, and filler material may or may not be added.

Plasma arc welding uses a nonconsumable electrode. The torch has a nozzle that creates a gas chamber surrounding the electrode. The arc heats the gas fed into the chamber to a temperature where it becomes ionized and conducts electricity. The ionized gas is defined as plasma.

One type of plasma arc weld which can be made is a keyhole weld. The keyhole plasma arc welding process is a high power density welding process, therefore the arc has the capacity to penetrate completely through a thickness of material and make welds in a single pass. In the keyhole operation, molten metal is displaced to the top bead surface by the plasma stream (as it penetrates the weld joint) to form the keyhole. As the plasma arc torch then is moved along the weld joint, metal melted at the front side of the keyhole by the arc flows around the plasma stream to the rear where the weld pool progressively solidifies. The maximum weld pool volume and the resultant underbead root surface profile are largely determined by the force balance between the surface tension of the molten weld metal, the plasma arc current, and the velocity of the ionized gas exiting the orifice. If these forces are not properly balanced, the high velocity plasma gas flow can eject the molten metal out of the weld puddle, down into the area below the weld root surface. This unacceptable condition is called overpenetration. The force balance is most difficult to balance during initiation and termination of the keyhole (e.g., at the start and stop areas of the weld).

Plates are often welded using the plasma arc weld process and a preplaced, rectangular shim of filler material. FIG. 1 shows a known shim 10 having 45° tapers at each end to assist the weld operator in starting and stopping the weld process. The 45° angled ends of the shim 10 allow an operator approximately 3 seconds to progress from weld start parameters up to full weld thickness, solid state welding parameters as the weld moves along the 45° taper. Metal is displaced during the keyhole formation to the backside of the hole and forms a large puddle with an inherent hydrostatic head being supported by surface tension and the plasma gas.

As the weld progresses along the 45° taper and into the full thickness, some turbulence can occur in the puddle. The turbulence causes molten metal to be blown into the underbead area by the plasma gas flow through the keyhole, resulting in metal from the puddle sagging out, or draining, into the underbead area. This overpenetration of the metal occurs in approximately 3% of welds made with this process, leading to time-consuming and expensive repairs.

SUMMARY OF THE INVENTION

It is thus an object of the present invention to provide an improved method for making keyhole type plasma arc welds between workpieces which reduces the amount of overpenetration.

It is a further object of the invention to provide a device which can be used with the method of the invention to improve keyhole plasma arc weld quality.

Accordingly, a generally rectangular shim having approximately 25° tapers at each end and a notch above the thicker end of each taper is placed between a pair of workpieces to be welded together. The plasma arc welding can then begin at about 20% lower heat input and the welding operator is provided with approximately 6 seconds to progress to full weld thickness, higher heat input parameters. Overpenetration of the weld is thus accordingly reduced since the size of the hydrostatic head of molten metal in the keyhole weld is reduced until steady state operation is achieved.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENTS

Figure 1:
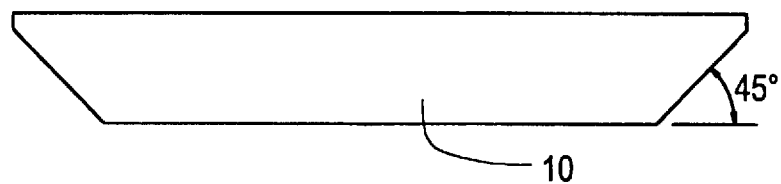
FIG. 1 is a side elevation view of a known shim.
Figure 1A:
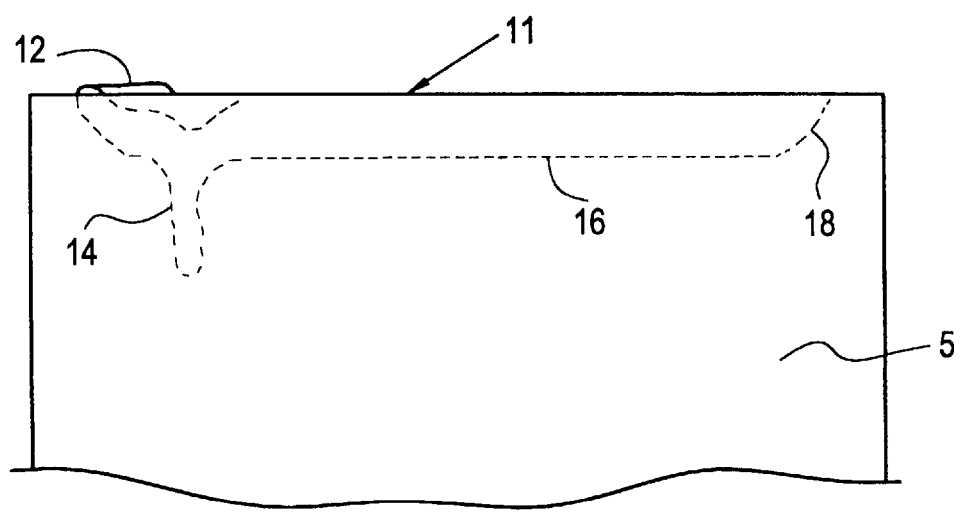
FIG. 1A is a side elevation view showing a weld having overpenetration.

Referring now to the drawings, in which the same or functionally similar elements are identified with like reference numerals, FIG. 1A shows a workpiece 5 having a plasma arc weld 11 in which overpenetration, or a sag 14 of molten metal, has occurred. Molten metal region 12 is formed during the initial stages of the plasma arc weld process. Steady state portion 16 of the weld is formed after the plasma arc weld has attained full weld thickness parameters. Weld end 18 is formed as the weld process is stopped. The non-uniform portion and undesirable features of the sag 14 can be clearly seen in FIG. 1A.

Figure 2:
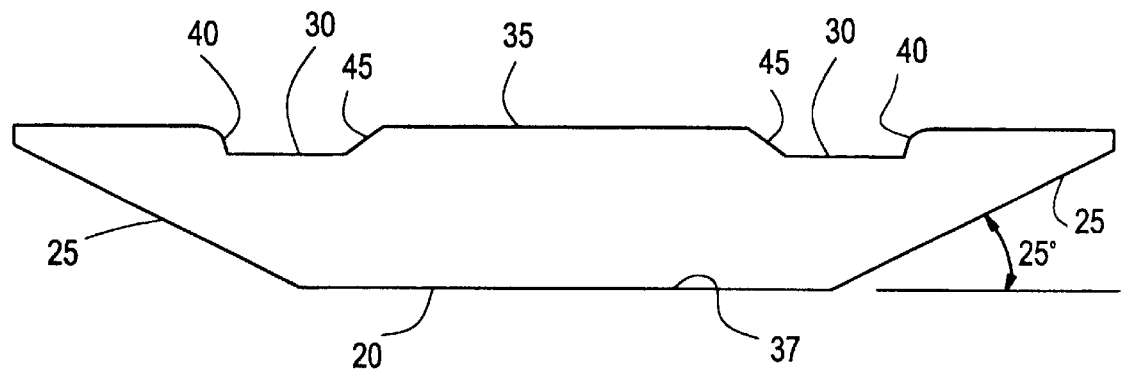
FIG. 2 is a side elevation view of a shim according to the invention.
Figure 5:
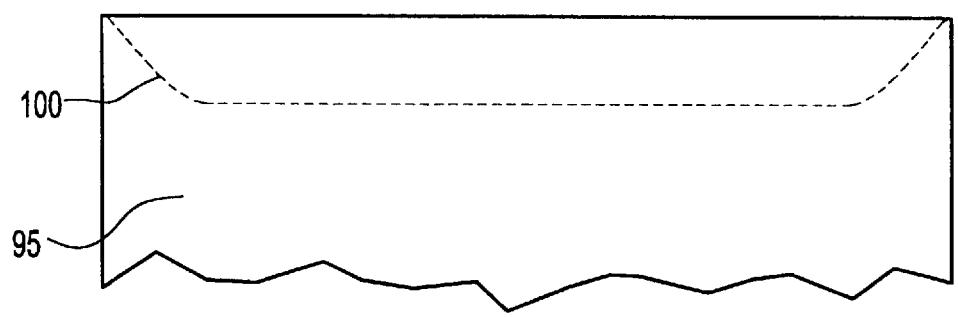
FIG. 5 is a side elevation view showing a weld made using the shim of the invention.

FIG. 5 displays a preferred weld 100 joining workpieces 95, 90, and which is more easily obtained with the shim 20 shown in FIG. 2.

Shim 20 according to the invention and shown in FIG. 2 has a body with tapered ends 25 and a pair of notches 30 in the top edge 35. The ends 25 taper at an angle of about 25° from the bottom edge 37 of the body of the shim 20. The taper angle can be about 40° or less to extend the length of the taper section, but 25° is preferred. The notches 30 have inclined inner sides 45, which slope into the notches 30, and rounded outer sides 40, which form an arcuate edge. The notches 30 are positioned over the corners formed by the lower edge 37 of the shim 20 and the tapered ends 25.

The shallower taper angle of the ends 25 combined with the notches 30 have the effect of reducing the amount of molten metal being displaced into the puddle formed behind the keyhole during welding, and thus also, allows the weld to be started at a lower heat input. As a result, the hydrostatic head which forms in the start region and which drives the sagging mechanism is reduced and the starting sequence for the weld is made more gradual.

Preferred dimensions for a shim 20 according to the invention are as follows. The notches are approximately 0.5 inches wide at the bottom and 0.1 inches deep. The tapered ends 25 are about 0.52 inches long. The dimensions of the shim 20 may be adjusted appropriately according to the size of the workpieces which the shim 20 is being used to weld together.

Figure 3:
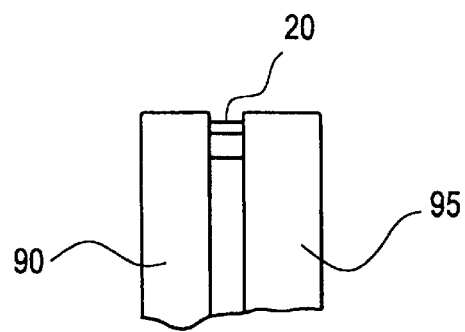
FIG. 3 is an end view of shim positioned between two workpiecs.
Figure 4:
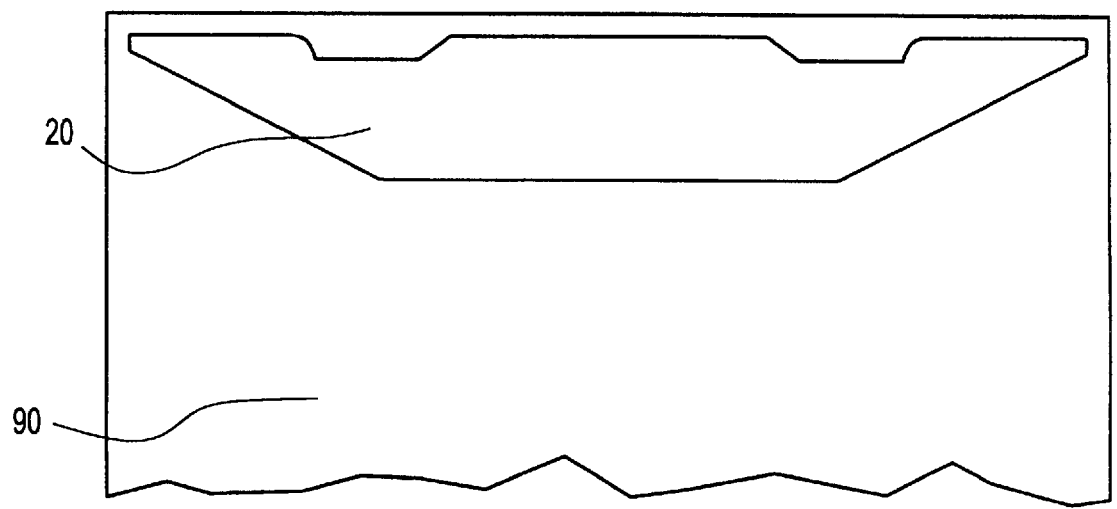
FIG. 4 is a sectional side elevation view showing the shim in position against one of the workpieces.

FIGS. 3 and 4 show a preferred starting position for the shim 20 between workpieces 90, 95. A small space is left around the perimeter of the shim 20 and the edges of the workpieces 90, 95. Preferably, any gap between the planar surfaces of the shim 20 and the workpieces 90, 95 is relatively small. However, when the shim 20 according to the invention is used, the gap may be almost 0.04 inches before weld overpenetration occurs, as opposed to an 0.020 inch gap causing overpenetration with the known shim 10.

In use, the shim 20 is positioned between the workpieces 90, 95 to be welded together. The plasma arc weld begins at one of the tapered ends 25 at a heat input which is approximately 20% less than that used with the known type of shim 10 to form the keyhole to start the weld. The plasma welding parameters are raised in about 6 seconds to steady state weld parameters as the welding electrode is moved from the starting end 25 of the shim 20, past the adjacent notch 30 and toward the main body with the full thickness of the weld. The weld then continues with the electrode operated at steady state conditions until the opposite end 25 of the shim 20 is reached, when the plasma parameters are again dropped and the weld is finished.

While the shim 20 has been described for use with straight line welds on planar workpieces 90, 95, it is considered easily adaptable to use with pipes using known preparations to the weld joint.

While a specific embodiment of the invention has been shown and described in detail to illustrate the application of the principles of the invention, it will be understood that the invention may be embodied otherwise without departing from such principles. For example, this method of starting a keyhole could be used on other applications (such as pipe welding) with a proper joint design. A shim may or may not be used depending on the joint design.

We claim:

1. A method of plasma arc welding two workpieces together while reducing weld overpenetration, comprising:

providing two workpieces to be welded together in close proximity to each other;

providing a shim comprising a shim body having top and bottom edges, the body having a generally rectangular shape with opposite ends which taper away from the body and a pair of notches in the top edge of the shim body, one notch located over each corner formed between the bottom edge of the shim body and each tapered end, the shim positioned between the workpieces;

starting a plasma arc weld keyhole adjacent to one of the tapered ends of the shim with a plasma arc welder to form a weld between the workpieces;

moving the plasma arc welder longitudinally along the shim from the plasma arc weld keyhole toward the opposite tapered end of the shim;

raising a welding heat input of the plasma arc welder while moving the plasma arc welder longitudinally so that the plasma arc welder is at full weld thickness parameters when the welder has moved past the notch adjacent the tapered end where the weld keyhole was started; and ending the plasma arc weld at the opposite tapered end of the shim.

* * * * *